Oct. 31, 1967   H. TOLCHIN   3,350,279
DISTILLATION APPARATUS
Filed March 3, 1966   2 Sheets-Sheet 2
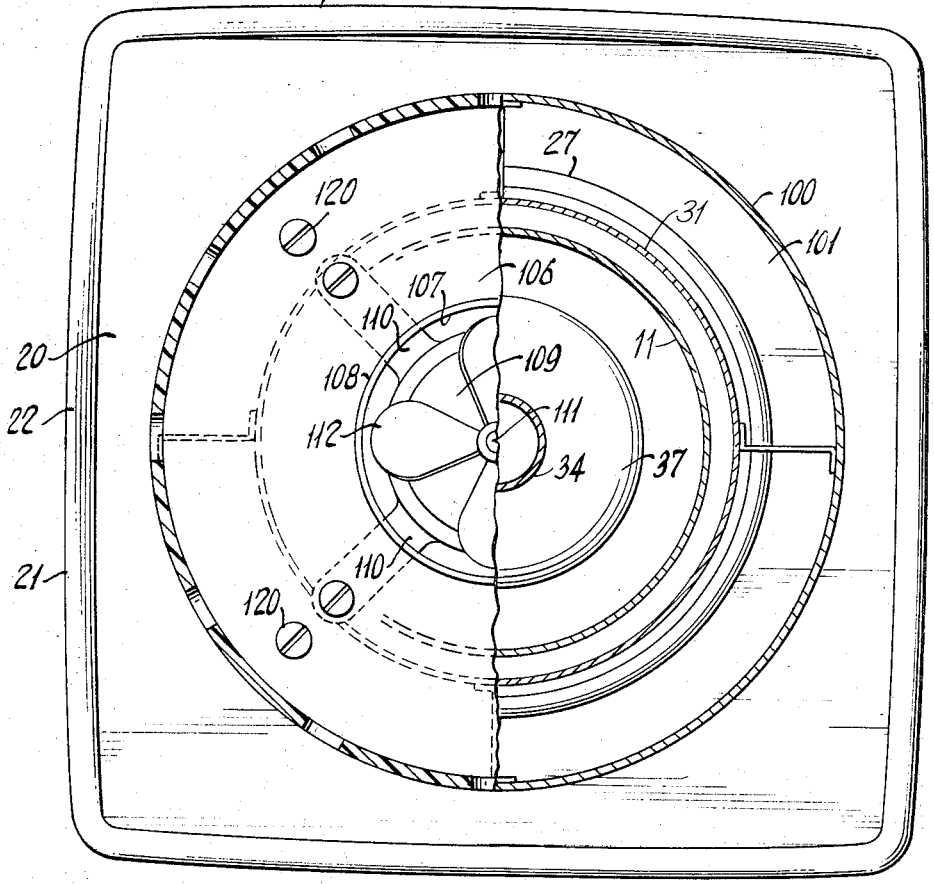
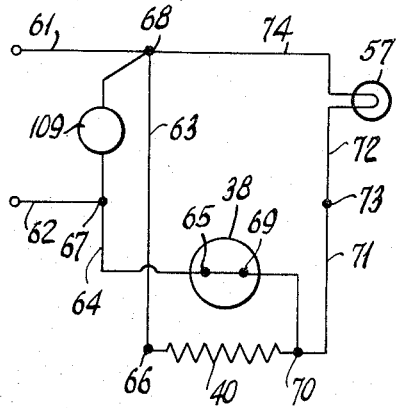
INVENTOR
HYMAN TOLCHIN
BY
ATTORNEY

United States Patent Office 3,350,279
Patented Oct. 31, 1967

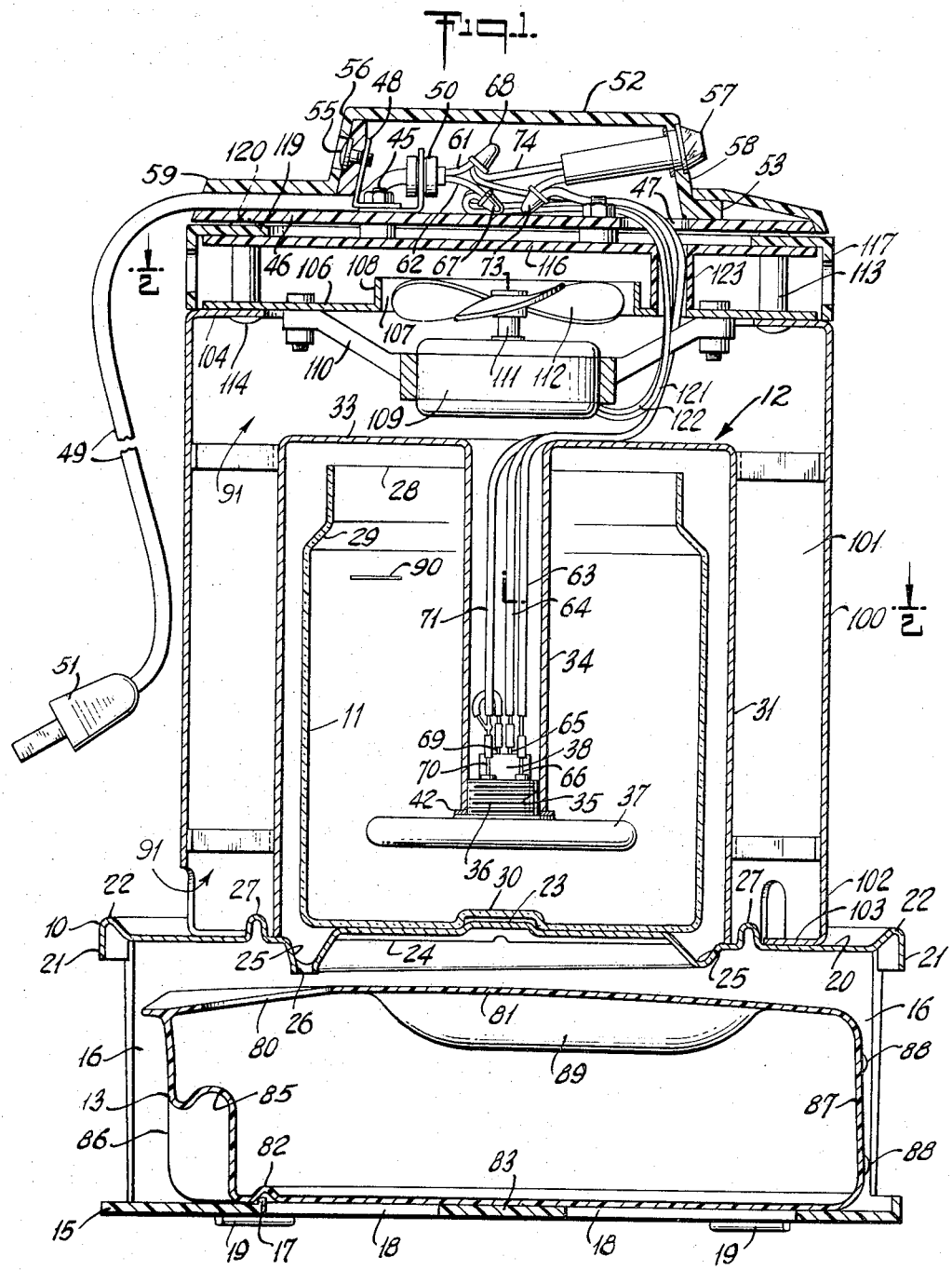

3,350,279
DISTILLATION APPARATUS
Hyman Tolchin, Monsey, N.Y., assignor to American Machine & Foundry Company, a corporation of New Jersey
Filed Mar. 3, 1966, Ser. No. 531,527
Claims priority, application Great Britain, Mar. 9, 1965, 9,920/65
7 Claims. (Cl. 202—83)

ABSTRACT OF THE DISCLOSURE

A portable distillation unit with a shroud surrounding the condensing chamber defining with the chamber an air-cooling flow path.

---

This invention relates in general to distillation apparatus, and more particularly, to distillation apparatus which is particularly adapted to be used in the home.

In many places the portable water supply is contaminated by salts and other substances in solution which impart an unpleasant taste or odor to water and which render it unpleasant to drink. In other areas, where there is a clear and adequate supply of drinking water for the majority of the population, specific individuals may have to distill or import drinking water to avoid harmful reactions produced by particular ingredients of the drinking water. Even when it is not required for regular or special drinking purposes, distilled water should be used in the home to fill such appliances as steam irons and the like, and distilled water should be used to replenish fluid lost through evaporation from automobile storage batteries. In copending application Serial No. 254,286, filed Jan. 28, 1963, now Patent No. 3,278,395 granted Oct. 11, 1966, there is disclosed a distillation apparatus of the present type which, although highly satisfactory possesses certain drawbacks in that its efficiency is not high and its condensate rate to bulk correspondingly low.

It is, therefore, a principal object of this invention to provide a low cost but high yield, safe distillation apparatus suitable for home use.

Another object of this invention is to provide a distillation apparatus which will not be harmed when its fluid supply is exhausted or if it is accidentally knocked over or upset when left unattended.

A further object of this invention is to provide an extremely simple home distillation apparatus which has a cylindrical air cooled condenser from the inside of which there depends a heating element, the condenser seating upon a base which is a combined boiler support and condensate collection tray, the cylindrical condenser seating upon the base in any position of rotation relative to the base.

Yet another object of this invention is to provide a more simple and less expensive home distillation apparatus which will last indefinitely and impart no taste to the distilled water.

Many other objects, advantages and features of invention reside in the construction, arrangement and combination of parts involved in the embodiment of the invention and its practice as will be understood from the following description and the accompanying drawing wherein:

FIGURE 1 is a longitudinal vertical section through the distillation apparatus;

FIGURE 2 is a top cross sectional view taken along line 2—2 of FIGURE 1; and

FIGURE 3 is a wiring diagram showing the connection of the elements of this invention.

Referring to the drawing in detail, the home distillation apparatus of this invention consists of four basic components which are a base 10, a boiler 11, a condenser and heating unit 12, and a water collection bottle 13. The base 10 has a flat bottom portion 15 with two side walls 16 extending upward from it. A transverse ridge 17 extends upward near the front of bottom portion 15. The bottom portion 15 and the side walls 16 are formed with a single injection molding of a styrene plastic or the like. Openings 18 may be left in portion 15 of base 10 to conserve plastic. Four downward projections 19 are molded integrally with the base 10 to extend downward from portion 15 to act as feet to support portion 15 above a level surface.

A boiler support plate 20 of aluminum or any other suitable corrosion resistant material is fixed to the top edges of the side walls 16 of base 10. The boiler support plate 20 has a downward sloping outer skirt 21, the top of which forms the peripheral raised portion 22. A round central projection 23 has four downwardly pressed radial channels 24 extending outward from it. About the ends of the radial channels 24 is the circular drain trough 25 which is formed deeper into plate 20 towards the front of base 10. In the deepest portion of drain trough 25 there is formed the drain aperture 26. Disposed concentrically about drain trough 25 and the central projection 23 is the condenser shell locating ring 27 which is pressed sharply upward from plate 20.

Boiler 11 is of glass and has a completely open upper end 28 above an inward sloping shoulder 29. The bottom of boiler 11 contains an upwardly pressed indentation 30 which fits about the central projection 23 to instantly and easily position boiler 11 on base 10.

The condenser and heating unit 12 comprises a cylindrical aluminum condensing wall 31 having welded or otherwise fixed across the top thereof a top plate 33. A cylindrical jacket or shroud 100 preferably formed of a synthetic organic polymer is coaxial with and radially spaced from the condensing wall 31 to delineate therewith a vertical annular cooling air passage 101 and is connected to the condensing wall 31 by circumferentially spaced upper and lower radial support ribs extending between the shroud 100 and condensing wall 31. The bottom edge of shroud 100 is located above the level of the bottom edge of the condensing wall 31 and is provided with circumferentially spaced depending legs 102 terminating in inwardly directed lips 103 at the level of the bottom edge of the condensing wall 31 and adapted to engage the outer periphery of the locating ring 27, the spaces between the legs 102 defining inlet ports to the passageway 101.

The shroud 100 projects above the level of the top plate 33 and terminates in an inwardly directed peripheral flange 104. Resting on the flange 104 is an annular plate 106 provided with a central opening 107 surrounded by an integrally formed upwardly directed collar 108. A drive motor 109 is mounted to the undersurface of the annular plate 106 coaxial with the collar 108 by means of radially outwardly and upwardly projecting bracket arms 110 secured at their ends in some convenient manner, such as by bolts and nuts, to the plate 106 and includes an upwardly directed axial drive shaft 111. A blower fan 112 registers with the collar 108 and is affixed to the shaft 111 so as to rotate therewith, rotation of the fan 112 by the energized motor 109 effecting the upward flow of air through the collar 108.

Circumferentially spaced around the peripheral border of the annular plate 106 in registry with aligned openings in the plate 106 and flange 104 are a plurality of vertical spacers or posts 113 having tapped axial bores and fastened to and securing the plate 106 and flange 104 by screws 114 engaging said tapped bores. A circular plate 116 rests on and is supported by the posts 113 above the fan blades 112 and defines with the plate 106 an air outlet chamber. Resting on the upper edge of the shroud 100 is a louvered ring 117 having outlet ports 118 formed therein and provided along its upper edge with an inwardly directed peripheral flange 119 overlying the back of the plate 116. The plate 116 and ring 117 are secured to the posts 113 by screws 120. A vertical radially offset conduit is positioned between the plates 106 and 116 and registers with openings formed therein.

Extending downward from the center of top plate 33 is the tubular heating element support 34. The lowermost portion of the heating element support 34 contains the internal threads 35 into which there is turned the threaded portion 36 of the heating element 37.

A disk shaped thermostat 38, containing a switch which opens at a given temperature, is held in position by means of screws. Thermostat 38 opens if heating element 37 rises substantially above the temperature at which it operates to boil water when immersed in water. Heating element 37 contains a resistance element 40 which is cast within a metallic housing. A gasket or washer 42 may extend about the threaded portion 36 to provide a watertight seal between the tubular support element 34 and the heating element 37.

A disk-like plastic cover 44 is secured over plate 116 by studs 45 which are welded to project upward from plate 116. A cover 44 has a central lower portion 46 which extends to the rear of the cover 44. The central lower portion 46 contains an opening 47. A bracket 48 is secured by one or more studs 45 to the rear of opening 47. An electric cord 49 extends through a strain relief bushing 50 which is supported in one end of bracket 48. The other end of cord 49 carries a plug 51.

A handle 52 fits over the central lower portion 46 and has a forward lug 53 and two rearward lugs which slide under the cover 44 when handle 52 is urged forward into the position shown. A single screw 55 extends through the back wall 56 of handle 52 and is screwed into bracket 48 so that the single screw 55 and the forward lug 53 and rearward lugs fix the handle 52 to the top of the condensing and heating unit 12.

An indicator light 57 is fixed to extend through the front wall 58 of handle 52. The top wall 59 of handle 52 extends beyond the side walls of handle 52 so that the fingers of a hand may reach under top wall 59 and secure a good grip on handle 52.

The two strands 61 and 62 of cord 49 are joined to the leads 63 and 64 which extend to one connection 65 of thermostat 38 and one connection 66 of the resistance element 40 by means of the wire nuts 67 and 68. Connections 69 and 70 of thermostat 38 and resistance element 40 are connected together and connection 70 is joined to lead 71 which is connected to lead 72 of indicator light 57 by means of wire nut 73. Lead 74 of indicator light 57 is joined by wire nut 68 to leads 63 and 61. The motor leads 121 and 122 are connected to strands 61 and 62, respectively. The leads 63, 64, 71, 121 and 122 pass through the conduit 123 which affords communication with the connecting terminals.

The water collecting bottle 13 is molded from a suitable plastic such as a high density polyethylene. Bottle 13 has an opening 80 formed in its top wall 81. The bottle 13 also contains an upwardly pressed transverse groove 82 formed in its bottom wall 83. When the bottle 13 is slid into position on top of the bottom portion 15 of base 10, the transverse ridge 17 hooks in groove 82 to locate bottle 13 with opening 80 directly below aperture 26. Bottle 13 contains indented portions 85 in its front wall 86 so that the center portion of the front wall 86 forms a handle so that bottle 13 may be withdrawn from within base 10. The rearmost wall 87 of bottle 13 has the small feet 88 formed integrally on it so that bottle 13, when it is substantially filled with condensate or distilled water, may be stood vertically on the feet 88 within a refrigerator. Depressions 89 are formed on each side of a central portion of top wall 81 so that the hand of a user may grasp bottle 13 when it is in the upright position.

The device operates in the following manner. Boiler 11 is filled to a suitable level, as indicated by a mark 90, with impure or poorly tasting water. The glass boiler 11 is then placed on base 10 and positioned on it by means of the central projection 23 in the manner which has been described. The condenser and heating unit 12 is then grasped by handle 52 and placed over the boiler 11 as shown in FIGURE 1. The base 10 can be oriented in any direction so that the water bottle 13 may be easily inserted and removed from it. However, the condensing and heating unit 12 may be placed facing in any desired direction relative to the base so that the cord 49 is directed at the nearest electrical outlet.

When plug 51 is inserted in an outlet, heating unit 37 raises the temperature of the water within boiler 11 to the boiling point and energizes motor 109 to motivate the fan 112 to effect the rapid flow of air upwardly through the passageway 101, as shown by arrows 91, and rapidly cool the condensing wall 31. The effluent air flows about the motor 109 in its flow outwardly to cool the motor 109 to a safe operating temperature. The circulating cooling air rapidly conducts heat away from the cylindrical condensing wall 31 cooling it so that steam issuing from boiler 11 condenses on the inner surface of wall 31 and flows downward as water into the drain trough 25. Water in drain trough 25 flows to the lowest portion of the trough to run out aperture 26 to fill the water bottle 13. Because bottom portion 15 is supported above a level surface on the feet or downward projections 19, air may circulate below portion 15 to contact bottle 13 through the openings and cool the condensate within it to room temperature. In addition, both ends of base 10 are open to allow air to circulate about bottle 13 to cool it.

Since the boiler 11 is preferably made of glass, it is very easily cleaned and imparts no taste or flavor to the arising steam. Heating element 37 is disposed slightly above the bottom of boiler 11 so that all the liquid within the boiler 11 is not vaporized and leaves a liquor rich in impurities which may be poured out of the boiler to render it more easily cleaned. The forced air cooled aluminum condensing shell 31 is particularly efficient and imparts no taste to the hot condensate. As the condensate passes through aperture 26 in base 10, it is caught in the relatively inexpensive and shatter proof water bottle 13 where the condensate further cools and in which the distilled water may be stored. The relative volumes of the boiler 11 and the bottle 13 are such that, when all the fluid in boiler 11 reaching heating element 37 is vaporized, bottle 13 will be filled to a desired degree.

As the water level within boiler 11 falls below heating element 37, thermostat 38, as shown in FIGURE 3, will open an electrical connection disconnecting the resistance element 40 from the current source. While the resistance element 40 is connected to the current source, indicating light 57 is lit. When the thermostat 38 disconnects resistance element 40, it also disconnects light 57. As the heating element 37 cools below the value at which thermostat 38 closes, it closes again briefly to heat resistance element 40.

What is claimed is:

1. A distillation apparatus comprising a base member including an upper platform having positioning means in its upper face and an outlet opening formed therein, an open topped boiler resting on said platform as located by said positioning means, a condensate collecting bottle positioned in said base member below said platform, and having an opening registering with said outlet opening, and a heater and condensing assembly resting on said platform as located by said positioning means and including a peripheral condenser wall surrounding and spaced from said boiler delineating a condensation zone, a top plate extending across the top of said condenser wall above said boiler and having an opening formed therein, a shroud surrounding and spaced from said condenser wall to delineate an air passageway having a lower inlet and an upper outlet, said shroud extending above said condenser top plate, an upper wall carried by the upper part of said shroud above said condenser wall top plate and delineating a housing therewith communicating with said air passageway and having an outlet with the exterior, a motor driven blower disposed in said housing for drawing air upwardly through said air passageway and said housing and through said housing outlet part, a tubular support depending from said condenser top plate and engaging said opening herein, electrically energized heating means located at the bottom of said tubular support and means for connecting said heating means to a source of current including leads extending from said heating means through said tubular support.

2. The distillation apparatus of claim 1, including a partition extending across said housing and dividing said housing into a lower section communicating with said air passageway and an upper section communicating with the exterior, said partition having an opening formed therein, said fan registering with said opening.

3. The distillation apparatus of claim 2 wherein said fan motor is supported by and below said partition in said housing lower section.

4. The distillation apparatus of claim 1, wherein said heating means comprises a resistant heating element.

5. The distillation apparatus of claim 4, including a thermostatic switch position at the lower part of said tubular support, said resistance heating element being connected in series with said thermostatic switch to said current connecting means.

6. The apparatus of claim 1 wherein said positioning means comprises an upstanding circular rib formed in said platform.

7. The apparatus of claim 1 including a handle member positioned atop said housing, said connecting means including an electric cord extending from said handle member.

References Cited

UNITED STATES PATENTS

| | | | |
|---|---|---|---|
| 3,236,746 | 2/1966 | Poindexter et al. | 202—187 |
| 3,278,395 | 10/1966 | Rubinowitz | 202—83 |
| 3,312,600 | 4/1967 | Morton | 202—187 |

NORMAN YUDKOFF, *Primary Examiner.*

DAVID EDWARDS, *Assistant Examiner.*